United States Patent [19]

Zuvela

[11] 4,139,950
[45] Feb. 20, 1979

[54] DIRECTION RESPONSIVE FLUX GATE UNIT

[75] Inventor: Bernard R. Zuvela, Fountain Valley, Calif.

[73] Assignee: Scientific Drilling Controls, Newport Beach, Calif.

[21] Appl. No.: 736,126

[22] Filed: Oct. 27, 1976

[51] Int. Cl.² .............................................. G01C 17/28
[52] U.S. Cl. ...................................... 33/361; 324/247; 324/255
[58] Field of Search ...................... 324/43; 33/356, 361

[56] References Cited

U.S. PATENT DOCUMENTS

| 3,571,700 | 3/1971 | Paine ................................... 324/43 R |
| 3,888,201 | 6/1975 | Zuvela ................................. 318/588 |

FOREIGN PATENT DOCUMENTS

| 831637 | 1/1970 | Canada ..................................... 324/43 |
| 624083 | 5/1949 | United Kingdom ...................... 33/361 |

Primary Examiner—Richard E. Aegerter
Assistant Examiner—John W. Shepperd
Attorney, Agent, or Firm—William P. Green

[57] ABSTRACT

A flux gate unit for producing an output representing the directional orientation of the unit with respect to the horizontal component of the earth's magnetic field, and in which a saturable flux gate magnetic core structure is mounted for leveling movement relative to associated flux gate coil means, in a manner enabling maintenance of the core structure substantially continuously in level condition while avoiding the necessity for leveling movement of the flux gate coils, and thereby avoiding the necessity for connection of electrical leads to a movable part.

19 Claims, 6 Drawing Figures

DIRECTION RESPONSIVE FLUX GATE UNIT

BACKGROUND OF THE INVENTION

This invention relates to improved flux gate magnetometer or compass units for giving indications of directional orientation relative to an ambient magnetic field, normally the earth's field.

The flux gate devices of the present invention are of a known general type in which a core structure or core means of paramagnetic material are alternately driven magnetically in opposite directions and beyond saturation by an alternating current. The core means are also positioned to be in the earth's magnetic field and magnetically biased by that field. Associated flux gate coil means flux linked to the core means are operable in response to variations in saturation of the core means to produce an electrical output representing the directional orientation of the coil means relative to the earth's field. One prior art patent showing a flux gate arrangement of this general type is my prior U.S. Pat. No. 3,888,201 issued June 10, 1975 on "Auto-Pilot". In the arrangement of that Patent, the core takes the form of a ring of paramagnetic material having coils wound thereabout at different circularly offset locations.

In such flux gate devices, the magnetic bias provided by the earth's magnetic field causes two core portions associated with oppositely wound coils to become saturated at different times by reason of the presence of the earth's field. This differential saturation then causes development of an output signal representing the directional orientation of the unit relative to the earth's field. In my U.S. Pat. No. 3,888,201, there are four flux gate coils offset ninety degrees from one another and connected into a bridge circuit for producing the electrical output signal. It has also been proposed heretofore that separate input and output coils be utilized in conjunction with such a ring magnetometer, with the ouput coils being wound diametrically about the entire ring, in two mutually perpendicular planes. A ring core magnetometer of this type is described in a report commencing on page 7.1-1 of the "1965 Proceedings of the Intermag Conference, International Conference on Magnetics, Washington, D.C., U.S.A., Apr. 21, 22, 23, 1965", published by the Institute of Electrical and Electronic Engineers, Inc.

In instances in which a flux gate device of the described type may be employed as a compass element for a boat, aircraft, or the like, as in the auto-pilot of my U.S. Pat. No. 3,888,201, it may be necessary to mount the wound core, by gimbals or the like, for universal leveling movement relative to the rest of the device, to thereby always maintain a proper level orientation with respect to the horizontal, and thus assure development of an accurate directional indication. One disadvantage of such an arrangement, however, is that the electrical leads which are connected to the windings on the core may tend to interfere with and resist leveling movement of the core, or may eventually break or be damaged by the flexure occurring such movement.

SUMMARY OF THE INVENTION

A major purpose of the present invention is to provide an improved flux gate magnetometer or compass unit having a core structure which is free for leveling movement of the above discussed type but in which there is no necessity for connection of electrical leads to the shiftable core. This result is achieved by mounting the core and associated flux gate coil means to be in an appropriately coupled or flux linked relation magnetically, but to be physically constructed and positioned to enable leveling movement of the core means relative to and without corresponding movement of the associated coil means. The core structure is then free for leveling movement without restraint and without damage to any electrical leads.

In the preferred arrangement illustrated in the accompanying drawings, the flux gate coil means include output coils wound diametrically about a ring core, with two such diametrical coils desirably being provided in essentially perpendicular planes to respond to mutually perpendicular horizontal components of the earth's field. In addition, an input or primary coil or coils may be wound about the core structure, and be energized by alternating current to drive the core to saturation in opposite directions on each cycle of the current. The core may be mounted for its leveling movement relative to both the output and input coils. The core may be gimbaled or otherwise mounted for its universal movement within a surrounding hollow body, with the coils being wound about that hollow body.

BRIEF DESCRIPTION OF THE DRAWINGS

The above and other features and objects of the invention will be better understood from the following detailed description of the typical embodiments illustrated in the accompanying drawings in which.

DESCRIPTION OF THE PREFERRED EMBODIMENTS

Figure 1:
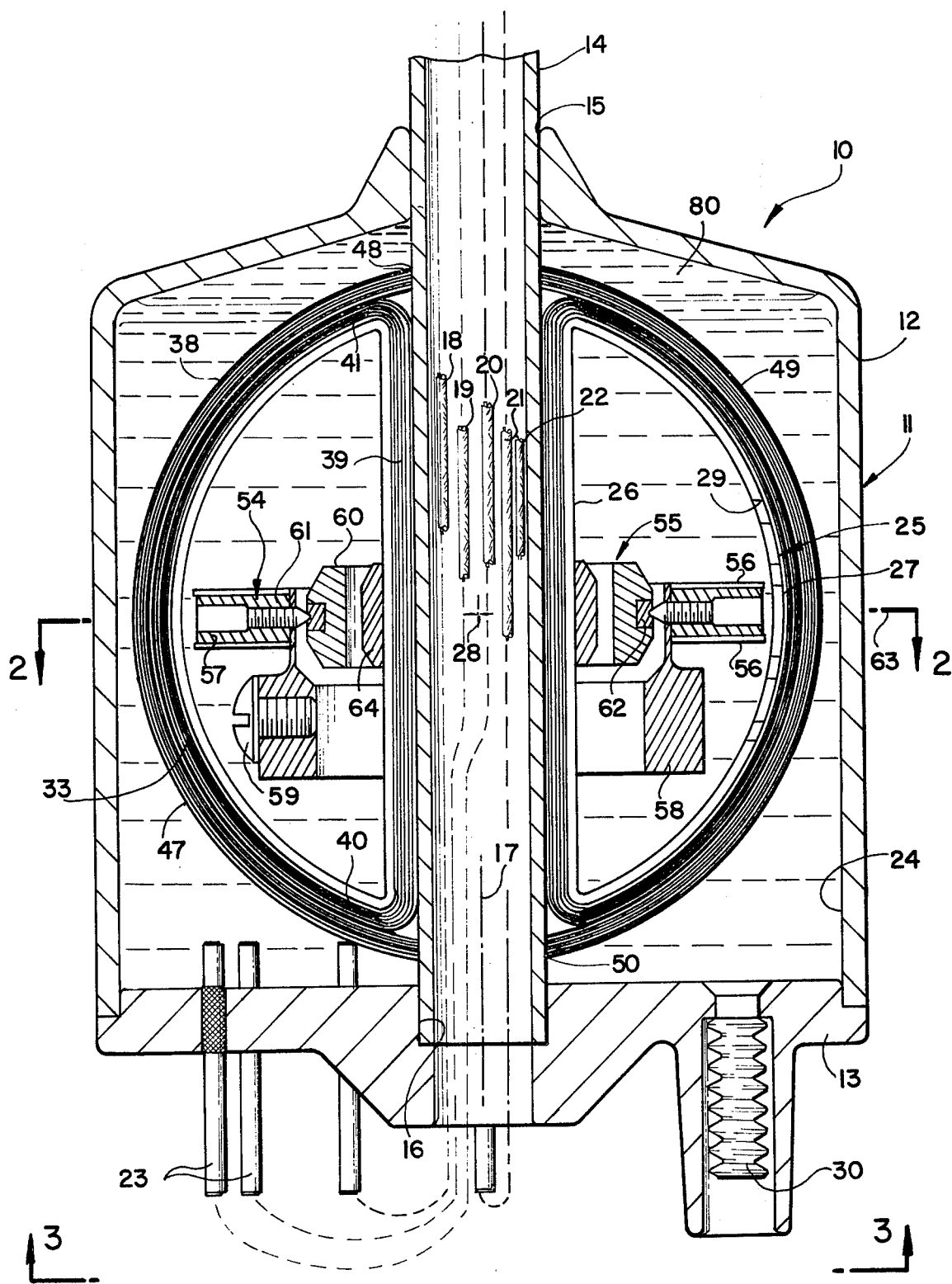
FIG. 1 is a vertical section through a direction responsive unit constructed in accordance with the invention.

Referring first to FIG. 1, I have shown at 10 a flux gate magnetometer unit to be utilized as a compass for producing an electrical output representing the directional orientation of the unit with respect to the horizontal component of the earth's magnetic field (or any other ambient field). As an example, the device may be mounted in a boat, aircraft or motor vehicle, or be carried by any other element whose directional orientation is to be indicated or controlled.

The unit 10 includes an outer hollow sealed non-magnetic housing or support 11, which may be formed of an upper inverted cup shaped section 12 closed at its lower end by a bottom wall 13, and a central tube 14 extending upwardly through the interior of the sections 12 and 13 and annularly sealed to both of these sections at 15 and 16. The housing may be rigidly mounted to the hull of a boat or other carrier structure, with the axis 17 of the housing in a normally vertical position, but being movable to an inclined or tilted position such as that represented in FIG. 4 when the boat or other carrier changes position accordingly. The upper end of tube 14 or any other portion of the housing may be employed for appropriately mounting the device in fixed position relative to the carrier structure. The electrical connections to the interior of the housing may be made through a number of wires 18, 19, 20, 21 and 22 which may extend downwardly through tube 14 and be connected to the coils through non-magnetic terminals 23 extending through bottom wall 13 of the housing. As will be apparent, the sections 12, 13 and 14 of the housing are desirably formed of an insulative material, such as an appropriate resinous plastic substance.

Within the annular chamber 24 formed in the housing and about its central tube 14, there is provided a hollow non-magnetic coil carrying body 25 (typically formed of a resinous plastic material), which may have an inner vertical cylindrical wall 26 centered about axis 17 and received in close proximity to tube 14. An outer annular wall 27 of hollow annular body 25 may be curved spherically as shown about a center 28 located on normally vertical axis 17 of the device. Wall 27 may contain apertures 29 at various locations to provide communication between the interior and the exterior of body 25, with the entire chamber 24 at both the interior and exterior of body 25 being filled with an appropriate damping liquid 80, such as oil. A non-magnetic bellows 30 may be expansible and contractible to compensate for expansion and contraction of the liquid within chamber 24, and the liquid may initially be filled into that chamber through a passage 31 ultimately closed and sealed by a non-magnetic seal screw 32.

Figure 2:
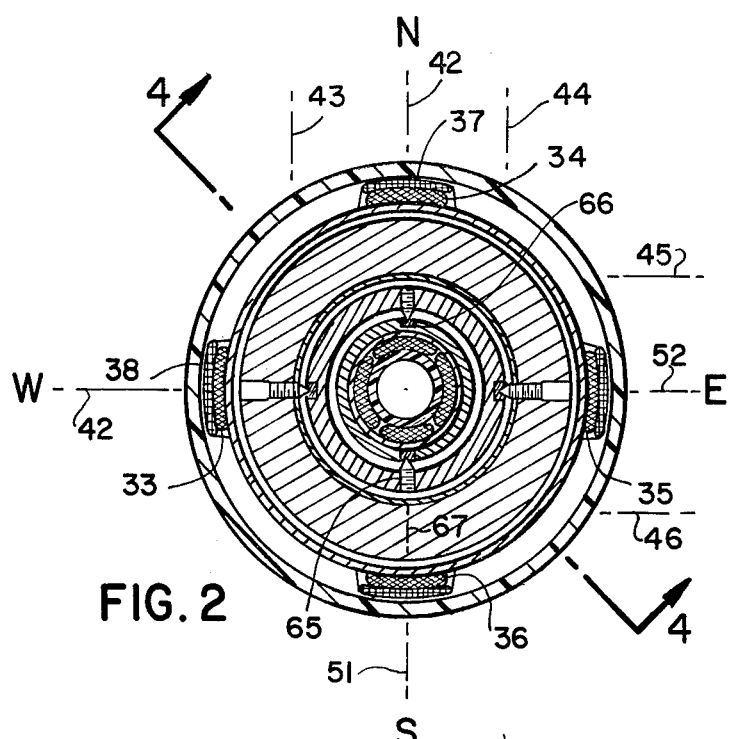
FIG. 2 is a reduced horizontal section taken on line 2—2 of FIG. 1.
Figure 3:
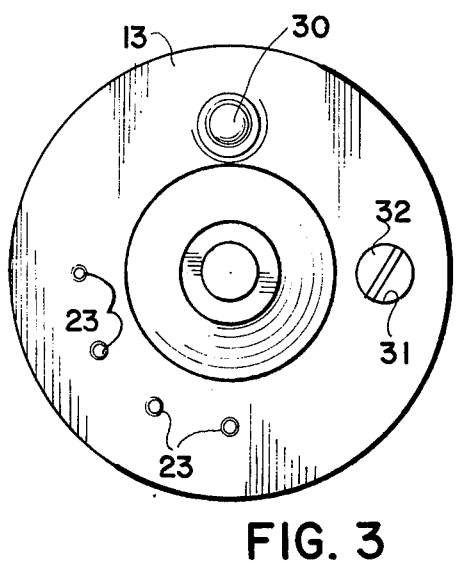
FIG. 3 is a reduced scalebottom plan view taken on line 3—3 of FIG. 1.

Wound about the spherical body 25 are six coils, including four series connected power input coils 33, 34, 35 and 36, and two output coils 37 and 38. Referring to FIGS. 1 and 2, the first of the input coils 33 is wound about the left side of hollow annular body 25 as viewed in those figures. This coil 33 includes a number of turns each extending first downwardly at 39 along the inner side of inner wall 26 of body 25, radially between wall 26 and the central tube 14, and then curves upwardly at 40 to extend arcuately along the outer surface of outer wall 27 of part 25 to an upper location 41, at which the next turn of the coil extends downwardly along the inside of part 25, etc. The four input coils 33, 34, 35 and 36 are all wound in this same manner about part 25, but with their axial central planes 42 (FIG. 2) offset circularly ninety degrees from one another. The coil 33 may be considered as wound essentially about an axis 43 (FIG. 2), which is horizontal when axis 17 of the device is vertical. Similarly, the opposite coil 35 may be considered as wound essentially about a horizontal axis 44 parallel to axis 43. In like manner, the two coils 34 and 36 may be considered as wound essentially about two parallel horizontal axes 45 and 46, which are perpendicular to and intersect axes 43 and 44. The four input coils are connected in series in a manner giving them all the same relationship to annular body 25, so that when energized by the same electrical current they produce magnetic fields advancing about vertical axis 17 in a common direction. That is, these coils are connected in a series aiding relationship with respect to the later to be discussed annular magnetic core contained within part 25.

Figure 5:
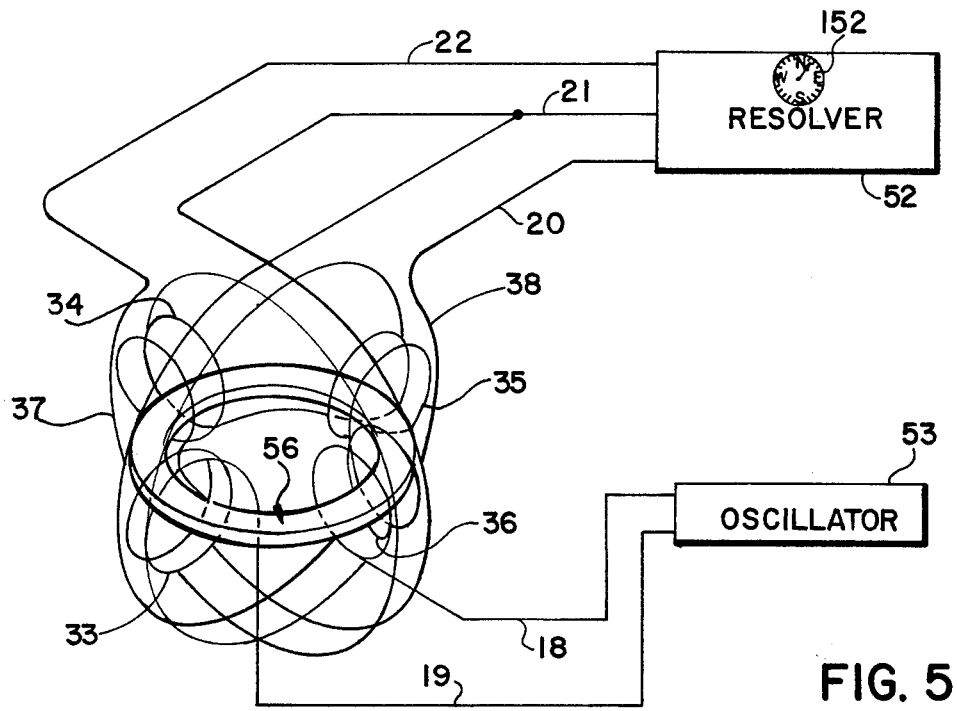
FIG. 5 is a diagrammatic representation of the arrangement of the electrical windings of FIGS. 1 to 4.

The two output coils 37 and 38 are wound diametrically about part 25, rather than about only one side of that part in the manner of the input coils. More specifically, and again with reference to FIGS. 1 and 2, the output coil 38 consists of a number of turns which extend first upwardly and arcuately at 47 along the outside of input coil 33, then past a side of an upper portion of tube 14 at 48, and then downwardly and arcuately along the opposite side of part 25 at 49, past a lower portion of tube 14 at 50, then upwardly again at 47, etc. through the desired number of complete turns. This coil may be considered as centered essentially about an axis 51 lying in one of the planes 42, with the second output coil 37 being similarly wound diametrically about part 25 but at a location offset circularly ninety degrees, to be centered essentially about a horizontal axis 52. Output coil 37 may be connected by two output leads 21 and 22 to a resolver 53 (FIG. 5), while the second output coil 38 may be connected through leads 20 and 21 to the resolver. The leads 18 and 19 to the series connected input coils are energized by an oscillator 53 delivering to the input coils an alternating current of an appropriate fairly high frequency (e.g. 5 kilohertz) to attain the desired flux gate operation.

Contained within hollow annular body 25 there is movably mounted an annular core structure 54, supported by a non-magnetic gimbal assembly 55 for universal pivotal movement about the previously mentioned center 38 of the device. Core structure 54 may typically include two upper and lower annular rings 56 of iron or other paramagnetic material secured to a carrier ring 57 which may be formed of brass or the like and may serve as the outer gimbal ring of assembly 55. An annular non-magnetic weight 58 may depend from and be rigidly secured to part 57, and carry non-magnetic screws 59 which are adjustable to preset the core rings 56 in a desired precisely level condition. The inner non-magnetic gimbal ring 60 is connected to outer ring 57 by a pair of aligned non-magnetic pivot pins 61 carried by ring 57 and projecting into recesses in a pair of jewel bearings 62 carried by ring 60, to thus mount ring 57 for pivotal movement about a first normally horizontal axis 63 extending through center 28. Similarly, the ring 60 is connected to a third non-magnetic gimbal ring 64 by non-magnetic pins 65 carried by ring 60 and projecting into recesses 66 in a pair of jewel bearings 66 carried by ring 64, to mount ring 60 for pivotal movement relative to ring 64 about a second normally horizontal axis 67 perpendicular to axis 63 and intersecting it at the center 28. The innermost ring 64 is rigidly secured to inner wall 26 of part 25 in any appropriate manner, and the part 25 and its carried coils are also suitably secured by adhesive or otherwise in fixed position relative to mounting tube 14.

The paramagnetic core rings 56 are designed and selected to be capable of conducting only a relatively small amount of magnetic flux through these core elements, and more particularly are so designed that the portion of each core ring within each of the input coils becomes saturated with magnetic flux during each half cycle of the alternating current through that coil. This saturation occurs at a time well before the alternating current potential reverses polarity. The paramagnetic rings 56 are of a material which can easily be reversed in polarity and repeatedly saturated as discussed by the magnetic field produced by the input coils in any position to which the device may be tilted, such as for example, the FIG. 4 position. The flux linkage between the coils and core elements remains essentially the same in all such positions.

To describe now a cycle of operation of the device of FIGS. 1 to 5, assume that oscillator 53 is in operation and is energizing the four input coils 33 through 36 in series, so that these coils alternately produce magnetic fields extending in opposite circular directions within core rings 56. The magnetic fields thus produced by the input coils are supplemented or biased by the horizontal component of the earth's magnetic field extending in a north to south direction. During one-half cycle of the alternating current, this component of the earth's magnetic field aids the field produced by input coils 33 through 36 in core elements 56 at one side of axis 17, and reduces the field produced by the input coils at the opposite side of axis 17. When one of the output coils 37 or 38 is positioned to extend in an east to west direction (the direction of coil 38 in FIG. 2), the discussed effects of the earth's magnetic field are maximized in the portions of the core rings extending through coil 38, so that one of those portions reaches, saturation before the other, and the difference in saturation times causes an output signal to be induced in coil 38 and lines 20 and 21 leading to the resolver. When one of the output coils is in a position of extension in a north to south direction (coil 37 in the position typically illustrated in FIG. 2), the earth's magnetic field has no effect on the portions of the core elements received within that coil, and there is no difference in the saturation times of those core portions, with resultant development of no output signal in lines 21 and 22. As will be understood, when the device turns to any intermediate position in which coils 37 and 38 are both disposed at an angle to the magnetic north to south direction, electrical output signals will be induced in both the output coils, representing two components of the earth's magnetic field which can be summed trigonometrically or resolved by resolver 52 to give an indication of the directional orientation of the coil assembly with respect to the magnetic north. Thus, resolver 52 or any other unit responsive to the outputs from coils 37 and 38 can indicate on a compass card 152 the direction to which unit 10 is turned about its vertical axis, or can be controlled automatically in accordance with changes in that directional orientation.

Figure 4:
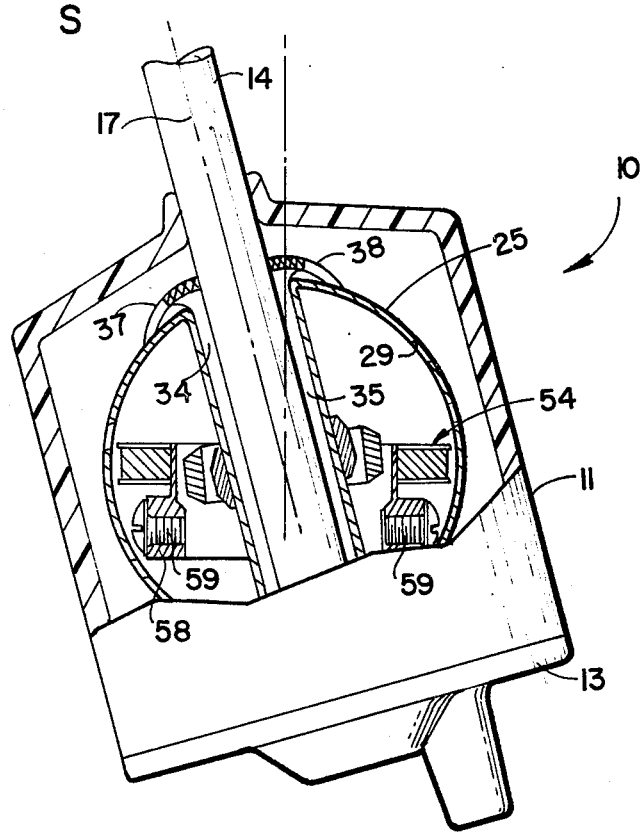
FIG. 4 is a section partially broken away taken on line 4—4 of FIG. 2, but showing the device in an inclined condition.

An accurate directional indication or response is produced at resolver 52 even though the housing of unit 10 may tilt to any of numerous different inclined positions, such as that of FIG. 4, since in all such positions the core elements 56 automatically pivot about the gimbal center 28 to remain in a level position in which the effect of the earth's magnetic field on the core elements is not altered or affected by inclination of the housing of the device.

While it will be apparent that the electrical and magnetic characteristics of the elements of the device may be varied within wide limits to satisfy any particular operating situation, the following example is given of a typical coil and coil arrangement which may be employed:

1. Input coils 33, 34, 35 and 36 — fifty turns each of thirty-four gauge copper wire.
2. Output coils 37 and 38 — two hundred turns each of forty-one gauge copper wire.
3. Core rings 56 — each formed of mumetal having a thickness of five mils (all other parts of the entire device formed of non-magnetic material).

It is contemplated that in the arrangement of FIGS. 1 to 5, there may be substituted for the input coils 33 through 36 one continuous annular coil extending about the entire annular extent of the core structure. Also, it may be possible in some cases to utilize only a single input coil perhaps at one side of the core, or to employ other input coil arrangements capable of producing the desired magnetic field in the core.

Figure 6:
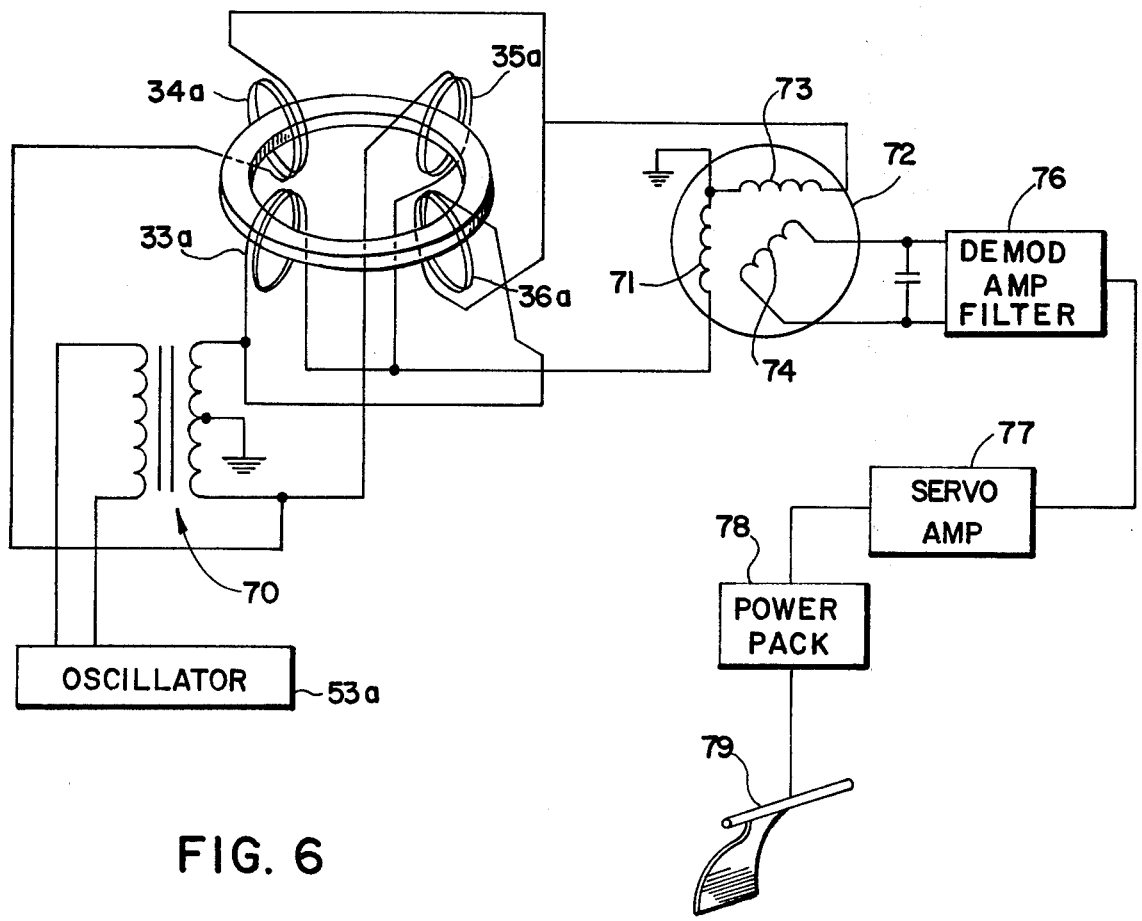
FIG. 6 is a view similar to FIG. 5 but showing a variation winding arrangement.

FIG. 6 shows a variational arrangement in which there are utilized only four coils, connected in a bridge relationship as discussed in my prior U.S. Pat. No. 3,888,201. These four coils 33a, 34a, 35a and 36a may be constructed and mounted exactly the same as input coils 33 through 36 of FIGS. 1 to 5, being wound about a body such as that shown at 25 and about a relatively universally pivotable core structure such as that shown at 54. As in my prior Patent, the two coils 33a and 35a are connected in series aiding relation across the output coil of a transformer 70 energized by oscillator 53a. Similarly, the two opposed coils 34a and 36a are connected in series aiding relation across the same output coil of transformer 70 (i.e. all coils 33a to 36a produce M.M.F. in the same circular direction). The midpoint between coils 33a and 35a is connected to a first end of one stator coil 71 of a resolver 72, and the midpoint between the two coils 34a and 36a is connected to the end of a second stator coil 73 of the resolver, with the junction of the two stator coils being connected to a center tap of the output coil of the transformer through ground. The coils 33a through 36a of the flux gate assembly of FIG. 6 induce in coils 71 and 73 currents representing two components of the angle through which coils 33a through 36a are turned about a vertical axis from a predetermined position of alignment with the horizontal component of the earth's magnetic field. A resultant directional magnetic field is produced in the resolver, which induces an output in rotor coil 74 of the resolver except when that coil is aligned with the resultant field produced by coils 71 and 73. Any output produced in coil 74 may act through a demodulator and amplifier and filter unit 76, and a servo-amplifier 77 to energize a power pack 78 which may turn a rudder 79 of a boat to attain an auto-pilot steering action as discussed in my prior Patent. The outputs from the bridge circuit within which coils 33a through 36a are connected may of course be utilized in any other manner, either to indicate the direction to which the device is turned relative to the earth's magnetic field, or to control a unit in correspondence with that direction. As in the first form of the invention, the universal pivotal movement of the core of FIG. 6 enables the core to always remain in a horizontal or level position to be affected in a predictable and consistant manner by the horizontal component of the earth's magnetic field.

While certain specific embodiments of the present invention have been disclosed as typical, the invention is of course not limited to these particular forms, but rather is applicable broadly to all such variations as fall within the scope of the appended claims.

I claim:
1. Direction responsive apparatus comprising:
   a support which has a predetermined axis and is movable relative to an ambient magnetic field between positions in which said axis is either directly vertical or tilted from true vertical;
   flux gate coil means carried by said support for movement therewith between said positions and relative to said field;
   a gravity actuated flux gate core of saturable paramagnetic material which is flux linked to said coil means and is mounted for leveling movement relative thereto and extends essentially about and is spaced radially from said axis;
   means for delivering a periodically fluctuating electric current to at least a portion of said coil means in a relation driving said core to magnetic satura- tion alternately in opposite directions and producing an electrical output representing directional orientation; and a universal connection all portions of which are spaced radially from said axis, and which extends at least partially about said axis and connects said core to said support in a relation mounting the core for universal pivotal leveling movement relative to said coil means and said support and about a point essentially on said axis;

said coil means having portions formed of conductor turns which, as seen in cross section in a plane containing said axis, completely encircle all portions of said universal connection and said core which are at a particular side of said axis as viewed in said plane, so that each turn extends first in one axial direction at the radially inner side of the universal connection and core and then in the opposite axial direction at the radially outer side of the universal connection and core, but in a spaced relation enabling said leveling movement of the core as supported by the universal connection relative to and within the encircling conductor turns.

2. Direction responsive apparatus as recited in claim 1, in which said coil means include additional conductor turns wound essentially diametrically of said axis and encircling the universal connection and core at two opposite sides of said axis.

3. Direction responsive apparatus as recited in claim 1, including weight means connected to said core and supported with it by said universal connection, said turns of said coil means, as viewed in said cross section, encircling said weight means in addition to said universal connection and said core.

4. Direction responsive apparatus as recited in claim 1, in which said turns of the coil means which encircle said universal connection and core as viewed in axial cross section form four coils energized by said periodically fluctuating current and having their centers offset circularly ninety degrees from one another about said axis.

5. Direction responsive apparatus as recited in claim 1, in which said conductor turns which encircle said universal connection and core include four coils encircling the universal connection and core at four different locations offset essentially ninety degrees from one another and connected in series to said periodically fluctuating electric current.

6. Direction responsive apparatus as recited in claim 5, in which said coil means include two additional coils wound diametrically about said universal connection and core in spaced relation thereto and at locations offset essentially ninety circular degrees from one another.

7. Direction responsive apparatus as recited in claim 6, including means responsive to signals induced in said two diametrically wound coils to produce said electrical output representing said direction orientation.

8. Direction responsive apparatus as recited in claim 1, including a hollow generally annular coil mounting structure carried by said support and centered about said axis and disposed about said universal connection and core in spaced relation thereto to allow universal pivotal leveling movement of the core relative to said coil mounting structure, said coil means being wound about said hollow coil mounting structure.

9. Direction responsive apparatus as recited in claim 8, in which said hollow coil mounting structure has an inner essentially tubular wall and an outer essentially spherical wall.

10. Direction responsive apparatus as recited in claim 1, including an essentially annular hollow coil mounting structure having an outer spherically curved wall along which radially outer portions of said conductor turns extend essentially arcuately.

11. Direction response apparatus as recited in claim 1, in which said coil means have portions which curve essentially arcuately in a relation maintaining a predetermined flux linked relation between said core and said curved portions of said coil means in different relative settings thereof.

12. Direction responsive apparatus as recited in claim 1, in which said coil means include two pairs of coils disposed about said core with the coils of each pair at diametrically opposite locations and connected in series but reversely to said fluctuating current, and with each pair offset essentially ninety degrees from the other pair, there being output leads deriving output signals from midpoints between the coils of the two pairs representing two perpendicular components of the ambient field.

13. Direction responsive apparatus as recited in claim 1, in which said support includes a housing containing said core and universal connection, and liquid completely filling the housing to prevent collapse thereof under high external pressures.

14. Direction responsive apparatus comprising:
a support;
flux gate coil means carried by said support for movement therewith to positions of different directional orientation with respect to an ambient magnetic field, and to positions in which a predetermined axis which is fixed relative to the coil means and support is either directly vertical or tilted from true vertical;
a gravity actuated flux gate core of saturable paramagnetic material which is flux linked to said coil means and is mounted for leveling movement relative thereto and extends essentially about and is spaced radially from said axis;
means for delivering a periodically fluctuating electric current to at least a portion of said coil means in a relation driving said core to magnetic saturation alternately in opposite directions and producing an electrical output representing said directional orientation; and
a universal connection spaced radially from and extending at least partially about said axis and connecting said core to said support in a relation mounting the core for universal pivotal leveling movement relative to said coil means and said support and about a point essentially on said axis;
said coil means having portions formed of conductor turns which, as seen in cross section in a plane containing said axis, completely encircle portions of said universal connection and said core at a side of said axis, so that each turn extends first in one axial direction at the radially inner side of the universal connection and core and then in the opposite axial direction at the radially outer side of the universal connection and core, but in a spaced relation enabling said leveling movement of the core as supported by the universal connection relative to and within the encircling conductor turns;
said support including a center post extending along said axis, with said universal connection being disposed about said post, and with radially inner portions of said conductor turns being received radially between said post and said universal connection.

15. Direction responsive apparatus comprising:
a support;
flux gate coil means carried by said support for movement therewith to positions of different directional orientation with respect to an ambient magnetic field, and to positions in which a predetermined axis which is fixed relative to the coil means and support is either directly vertical or tilted from true vertical;
a gravity actuated flux gate core of saturable paramagnetic material which is flux linked to said coil means and is mounted for leveling movement relative thereto and extends essentially about and is spaced radially from said axis;
means for delivering a periodically fluctuating electric current to at least a portion of said coil means in a relation driving said core to magnetic saturation alternately in opposite directions and producing an electrical output representing said direction orientation; and
a universal connection spaced radially from and extending at least partially about said axis and connecting said core to said support in a relation mounting the core for universal pivotal leveling movement relative to said coil means and said support and about a point essentially on said axis;
said coil means having portions formed of conductor turns which, as seen in cross section in a plane containing said axis, completely encircle portions of said universal connection and said core at a side of said axis, so that each turn extends first in one axial direction at the radially inner side of the universal connection and core and then in the opposite axial direction at the radially outer side of the universal connection and core, but in a spaced relation enabling said leveling movement of the core as supported by the universal connection relative to and within the encircling conductor turns;
said support including an outer housing, and a center post extending through said housing and about which said universal connection and coil means are carried.

16. Direction responsive apparatus comprising:
a support;
flux gate coil means carried by said support for movement therewith to positions of different directional orientation with respect to an ambient magnetic field, and to positions in which a predetermined axis which is fixed relative to the coil means and support is either directly vertical or tilted from true vertical;
a gravity actuated flux gate core of saturable paramagnetic material which is flux linked to said coil means and is mounted for leveling movement relative thereto and extends essentially about and is spaced radially from said axis;
means for delivering a periodically fluctuating electric current to at least a portion of said coil means in a relation driving said core to magnetic saturation alternately in opposite directions and producing an electrical output representing said directional orientation; and
a universal connection spaced radially from and extending at least partially about said axis and connecting said core to said support in a relation mounting the core for universal pivotal leveling movement relative to said coil means and said support and about a point essentially on said axis;
said coil means having portions formed of conductor turns which, as seen in cross section in a plane containing said axis, completely encircle portions of said universal connection and said core at a side of said axis, so that each turn extends first in one axial direction at the radially inner side of the universal connection and core and then in the opposite axial direction at the radially outer side of the universal connection and core, but in a spaced relation enabling said leveling movement of the core as supported by the universal connection relative to and within the encircling conductor turns;
said support including a center tube about which said universal connection is mounted.

17. Direction response apparatus comprising:
a support;
flux gate coil means carried by said support for movement therewith to positions of different directional orientation with respect to an ambient magnetic field, and to positions in which a predetermined axis which is fixed relative to the coil means and support is either directly vertical or tilted from true vertical;
a gravity actuated flux gate core of saturable paramagnetic material which is flux linked to said coil means and is mounted for leveling movement relative thereto and extends essentially about and is spaced radially from said axis;
means for delivering a periodically fluctuating electric current to at least a portion of said coil means in a relation driving said core to magnetic saturation alternately in opposite directions and producing an electrical output representing said directional orientation;
a universal connection spaced radially from and extending at least partially about said axis and connecting said core to said support in a relation mounting the core for universal pivotal leveling movement relative to said coil means and said support and about a point essentially on said axis;
said coil means having portions formed of conductor turns which, as seen in cross section in a plane containing said axis, completely encircle portions of said universal connection and said core at a side of said axis, so that each turn extends first in one axial direction at the radially inner side of the universal connection and core and then in the opposite axial direction at the radially outer side of the universal connection and core, but in a spaced relation enabling said leveling movement of the core as supported by the universal connection relative to and within the encircling conductor turns; and
a hollow coil mounting structure enclosing the universal connection and core and having a radially inner wall to which and about which said universal connection is mounted.

18. Direction responsive apparatus comprising:
a support;
flux gate coil means carried by said support for movement therewith to positions of different directional orientation with respect to an ambient magnetic field, and to positions in which a predetermined axis which is fixed relative to the coil means and support is either directly vertical or tilted from true vertical;

a gravity actuated flux gate core of saturable paramagnetic material which is flux linked to said coil means and is mounted for leveling movement relative thereto and extends essentially about and is spaced radially from said axis;

means for delivering a periodically fluctuating electric current to at least a portion of said coil means in a relation driving said core to magnetic saturation alternately in opposite directions and producing an electrical output representing said directional orientation;

a universal connection spaced radially from and extending at least partially about said axis and connecting said core to said support in a relation mounting the core for universal pivotal leveling movement relative to said coil means and said support and about a point essentially on said axis;

said coil means having portions formed of conductor turns which, as seen in cross section in a plane containing said axis, completely encircle portions of said universal connection and said core at a side of said axis, so that each turn extends first in one axial direction at the radially inner side of the universal connection and core and then in the opposite axial direction at the radially outer side of the universal connection and core, but in a spaced relation enabling said leveling movement of the core as supported by the universal connection relative to and within the encircling conductor turns;

said support including a housing disposed about and containing said coil means and said core, and containing a central mounting post; and a hollow annular coil mounting element disposed about said post and having an outer spherically curved wall and an inner straight cylindrical wall;

said universal connection including gimballing means connected to said inner wall of said hollow element and mounting said core for universal pivotal leveling movement relative thereto;

said encircling conductor turns including two pairs of diametrically opposed reversely connected primary coils would about said hollow element and having outer portions following the curvature of said spherically curved walls and inner straight portions extending along said straight cylindrical wall;

said coil means including also two pairs of output coils would diametrically about said hollow element and following the spherical curvature of said outer wall thereof and offset ninety degrees from one another and acting to produce output signals representing mutually perpendicular horizontal components of said ambient field.

19. Direction responsive apparatus comprising:

a support;

flux gate coil means carried by said support for movement therewith to positions of different directional orientation with respect to an ambient magnetic field, and to positions in which a predetermined axis which is fixed relative to the coil means and support is either directly vertical or tilted from true vertical;

a gravity actuated flux gate core of saturable paramagnetic material which is flux linked to said coil means and is mounted for leveling movement relative thereto and extends essentially about and is spaced radially from said axis;

means for delivering a periodically fluctuating electric current to at least a portion of said coil means in a relation driving said core to magnetic saturation alternately in opposite directions and producing an electrical output representing said directional orientation; and a universal connection spaced radially from and extending at least partially about said axis and connecting said core to said support in a relation mounting the core for universal pivotal leveling movement relative to said coil means and said support and about a point essentially on said axis;

said coil means having portions formed of conductor turns which, as seen in cross section in a plane containing said axis, completely encircle portions of said universal connection and said core at a side of said axis, so that each turn extends first in one axial direction at the radially inner side of the universal connection and core and then in the opposite axial direction at the radially outer side of the universal connection and core, but in a spaced relation enabling said leveling movement of the core as supported by the universal connection relative to and within the encircling conductor turns;

said support including a center post about which said universal connection is disposed.

* * * * *